United States Patent
Kong (10) Patent No.: US 9,807,324 B2
(45) Date of Patent: Oct. 31, 2017

(54) METHODS FOR CORRECTING BAD PIXELS AND APPARATUSES USING THE SAME

(71) Applicant: VIA Alliance Semiconductor Co., Ltd., Shanghai (CN)

(72) Inventor: Weiman Kong, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 20 days.

(21) Appl. No.: 14/972,538

(22) Filed: Dec. 17, 2015

(65) Prior Publication Data
US 2017/0064228 A1    Mar. 2, 2017

(30) Foreign Application Priority Data
Aug. 31, 2015   (CN) .......................... 2015 1 0547136

(51) Int. Cl.
| | | |
|---|---|---|
| *H04N 5/367* | (2011.01) | |
| *H04N 5/225* | (2006.01) | |
| *H04N 5/378* | (2011.01) | |
| *H04N 9/04*  | (2006.01) | |

(52) U.S. Cl.
CPC ............ *H04N 5/367* (2013.01); *H04N 5/225* (2013.01); *H04N 5/3675* (2013.01); *H04N 5/378* (2013.01); *H04N 9/045* (2013.01)

(58) Field of Classification Search
CPC .... H04N 5/367; H04N 5/3675; H04N 5/3678; H04N 5/225; H04N 5/378
See application file for complete search history.

(56) References Cited

U.S. PATENT DOCUMENTS

| | | | | |
|---|---|---|---|---|
| 2001/0052938 A1* | 12/2001 | Itoh | ...................... | H04N 5/3675 348/246 |
| 2002/0005904 A1* | 1/2002 | Mendis | ................... | H04N 9/646 348/246 |
| 2002/0196354 A1* | 12/2002 | Chang | .................. | H04N 5/2176 348/246 |
| 2006/0012694 A1* | 1/2006 | Yoneda | ................... | H04N 9/045 348/246 |
| 2008/0075354 A1* | 3/2008 | Kalevo | ................... | H04N 5/367 382/149 |
| 2009/0040343 A1* | 2/2009 | Kao | ........................ | H04N 9/045 348/246 |
| 2011/0234842 A1* | 9/2011 | Ishiga | .................... | H04N 5/367 348/223.1 |
| 2012/0162488 A1* | 6/2012 | Ogawa | ................... | H04N 5/367 348/246 |
| 2013/0229550 A1* | 9/2013 | Nakao | .................... | H04N 5/367 348/247 |

* cited by examiner

*Primary Examiner* — Abdelaaziz Tissire
(74) *Attorney, Agent, or Firm* — McClure, Qualey & Rodack, LLP (57) ABSTRACT

A method for correcting bad pixels, performed by a processing unit, at least contains: reading a block of a frame; labeling each pixel of the block as a good pixel, a weak pixel, or a bad pixel; detecting a weak-pixel pair from the block, which includes two pixels labeled as weak pixels; re-labeling the pixels of the weak-pixel pair as bad pixels converted from weak pixels; and correcting the pixels labeled as the bad pixels, and the bad pixels converted from weak pixels.

20 Claims, 7 Drawing Sheets

| R3 | Gb3 | R6 | Gb6 | R9 |
|---|---|---|---|---|
| Gr2 | B2 | Gr4 | B4 | Gr6 |
| R2 | Gb2 | R5 | Gb5 | R8 |
| Gr1 | B1 | Gr3 | B3 | Gr5 |
| R1 | Gb1 | R4 | Gb4 | R7 |

FIG. 5

METHODS FOR CORRECTING BAD PIXELS AND APPARATUSES USING THE SAME

CROSS REFERENCE TO RELATED APPLICATIONS

This application claims the benefit of China Patent Application No. 201510547136.9, filed on Aug. 31, 2015, the entirety of which is incorporated by reference herein.

BACKGROUND

Technical Field

The present invention relates to image processing, and in particular, it relates to methods for correcting bad pixels and apparatuses using the same.

Description of the Related Art

BPC (Bad Pixel Correction) replaces data in the bad locations of an image sensor with interpolations from nearby locations. The conventional bad-pixel-detection algorithm is fine for finding isolated bad pixels. However, it is not able to find short bad-pixel clusters, each of which is composed of three bad pixels with consecutive coordinates. Thus, methods for correcting bad pixels and apparatuses using the same are required to overcome the aforementioned drawbacks.

BRIEF SUMMARY

An embodiment of a method for correcting bad pixels, performed by a processing unit, at least contains: reading a block of a frame; labeling each pixel of the block as a good pixel, a weak pixel, or a bad pixel; detecting a weak-pixel pair from the block, wherein the weak-pixel pair includes two pixels labeled as weak pixels; re-labeling the pixels of the weak-pixel pair as bad pixels converted from weak pixels; and correcting the pixels labeled as the bad pixels, and the bad pixels converted from weak pixels.

An embodiment of an apparatus for correcting bad pixels is introduced. The apparatus at least contains: a camera module controller coupled to a camera module; and a processing unit coupled to the camera module controller. The processing unit obtains a frame via the camera module controller; reads a block from the frame; labels each pixel of the block as a good pixel, a weak pixel, or a bad pixel; detects a weak-pixel pair from the block, wherein the weak-pixel pair includes two pixels labeled as weak pixels; re-labels the pixels of the weak-pixel pair as bad pixels converted from weak pixels; and corrects the pixels labeled as the bad pixel, and the bad pixels converted from weak pixels.

The embodiments of the methods for correcting bad pixels and apparatuses using the same are provided under the condition of dynamic BPC to precisely label bad pixels and good pixels first. As to the weak pixels, which are easily misjudged, the embodiments of the invention determine whether a short bad-pixel cluster is present according to the locations of the detected weak-pixel pair and the bad pixel, without computing coordinates of all pixels, resulting in reduced computing complexity and fewer false positives.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
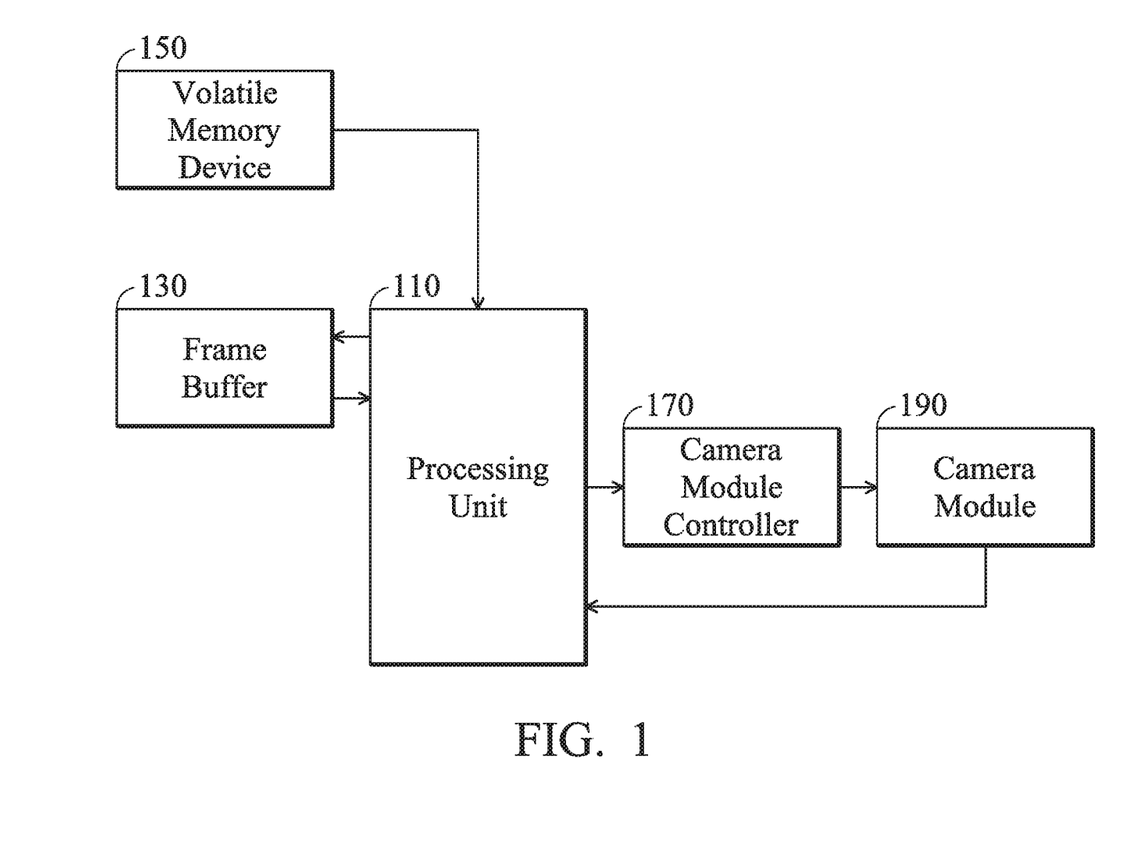
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may be integrated into an ISP (Image Signal Processor) and control, via a camera module controller 170, a camera module 190 to capture multiple frames. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. However, defective pixels of the image sensor fail to sense light levels correctly. Therefore, the processing unit 110 may detect defective pixels of the image sensor (too bright or too dark), correct data of the defective pixels of the captured frames and store the results in the frame buffer 130. The volatile memory 140, such as a DRAM (Dynamic Random Access Memory), for storing necessary data in execution, such as runtime variables, data tables, etc.

Figure 2:
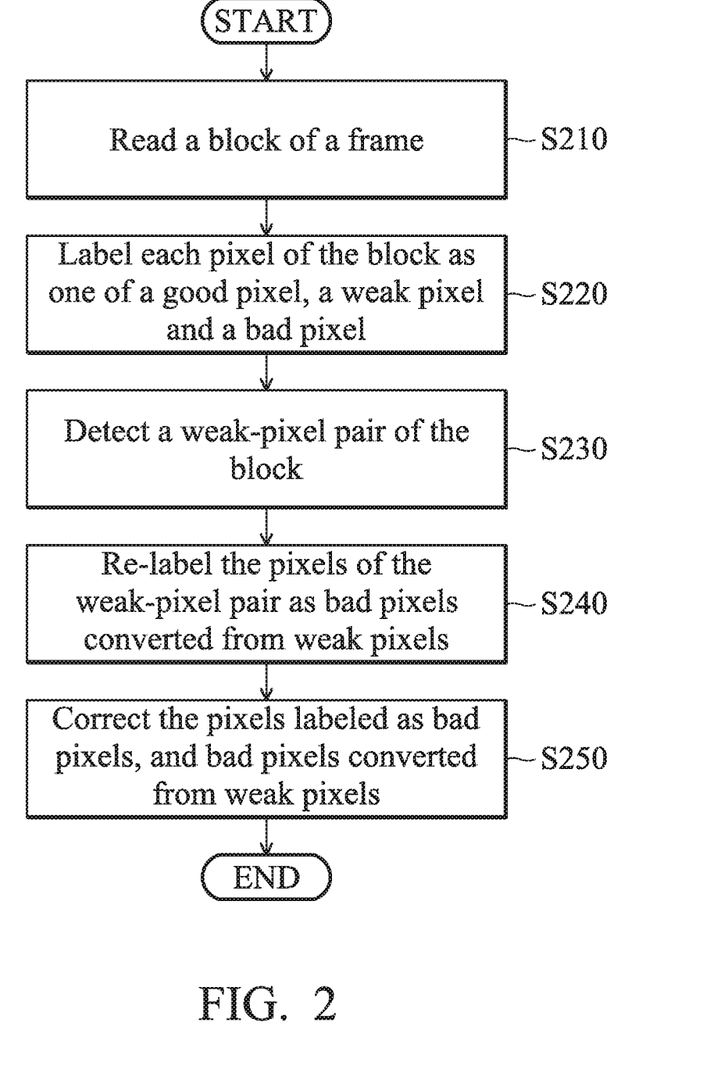
FIG. 2 is a flowchart illustrating a method for correcting bad pixels, which is performed by a processing unit, according to an embodiment of the invention.

FIG. 2 is a flowchart illustrating a method for correcting bad pixels, which is performed by a processing unit, according to an embodiment of the invention. The process dynamically detects single bad pixels and short bad-pixel clusters presented in each channel of one block, such as R-channel, Gr-channel, Gb-channel and B-channel, and corrects the detected bad pixels. The short bad-pixel cluster may contain three bad pixels presented at consecutive coordinates. The embodiments are limited in the field of dynamic BPC. Dynamic BPC assumes that, for example, each channel at most has two bad pixels in a 3×3 full-channel block and the quantity of bad pixels presented at consecutive coordinates is not greater than four: They are considered as noise if a quantity of bad pixels presented at consecutive coordinates equals or is greater than four. Noise reduction is a parallel issue and will not be discussed here. After reading a block of a frame (step S210), the processing unit 110 labels each pixel of the block as a good pixel, a weak pixel, or a bad pixel (step S220). Next, the processing unit 110 detects a weak-pixel pair of the block, wherein the weak-pixel pair contains at least two pixels labeled as weak pixels (step S230) and re-labels the pixels of the weak-pixel pair as bad pixels converted from weak pixels (step S240). It should be noted that, in the embodiments, step S240 is performed when two pixels labeled as weak pixels in conjunction with one pixel labeled as a bad pixel form a short bad-pixel cluster. Details will be described in the following paragraphs. Finally, the processing unit 110 corrects the pixels labeled as bad pixels, and bad pixels converted from weak pixels (step S250). The invention does not intend to discuss a detailed algorithm for the correction.

Figure 3:
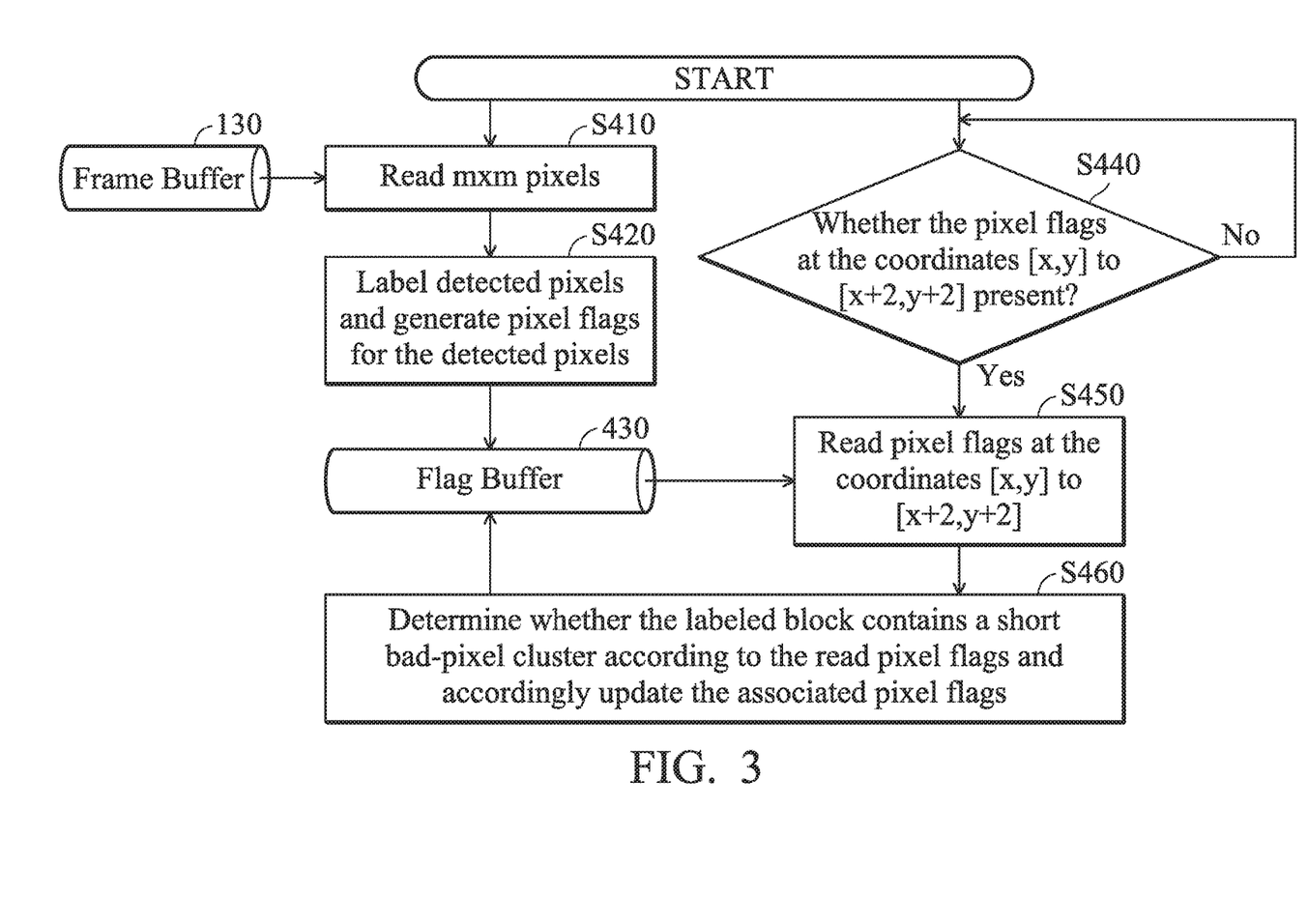
FIG. 3 is a flowchart illustrating a method for correcting bad pixels, which is performed by a processing unit, according to an embodiment of the invention.
Figure 4A:
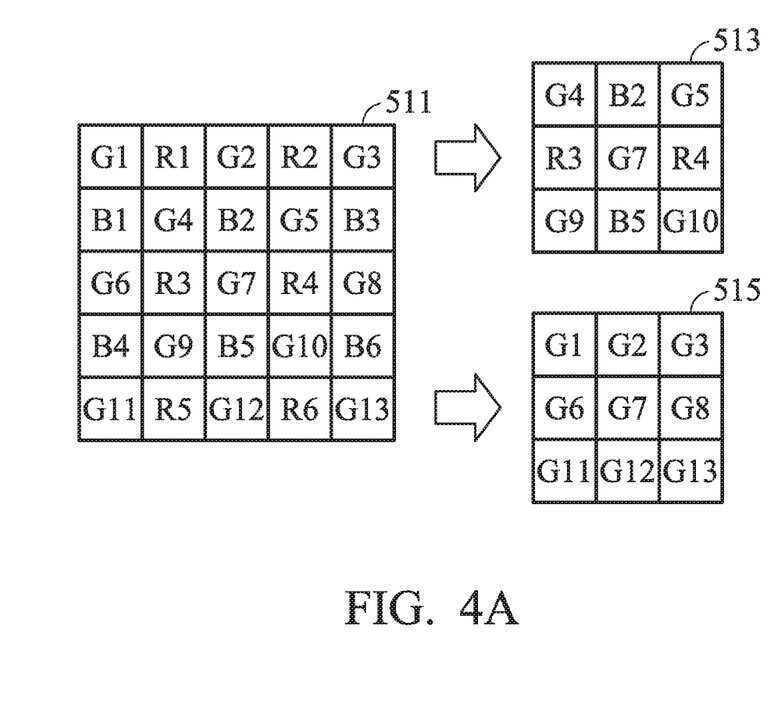
FIG. 4A is a schematic diagram illustrating acquisition of the inner block and the outer block for a detected Gr-pixel according to an embodiment of the invention.
Figure 4B:
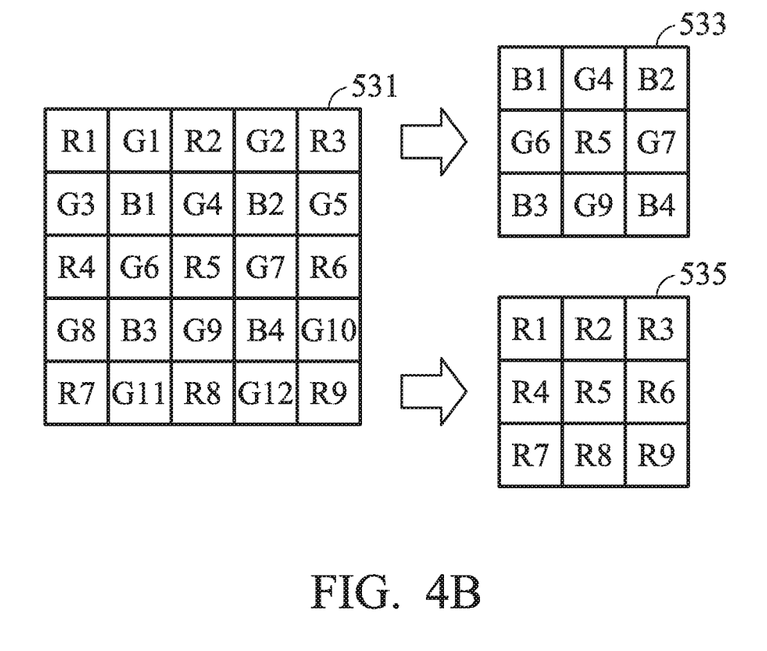
FIG. 4B is a schematic diagram illustrating acquisition of the inner block and the outer block for a detected R-pixel according to an embodiment of the invention.
Figure 4C:
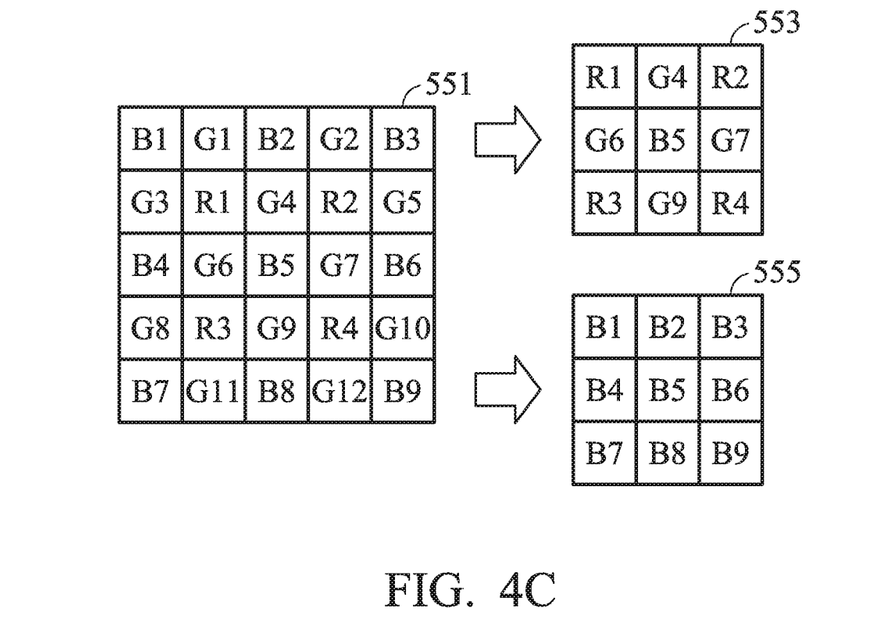
FIG. 4C is a schematic diagram illustrating acquisition of the inner block and the outer block for a detected B-pixel according to an embodiment of the invention.

FIG. 3 is a flowchart illustrating a method for correcting bad pixels, which is performed by a processing unit, according to an embodiment of the invention. The illustrated method does not discuss detailed correction algorithms and focuses on the detection of bad pixels. In general, bad pixel detection may be divided into two stages. The first stage is the single pixel detection (steps S410 to S420), in which one block (full channel) containing m×m pixels, such as 5×5 pixels, etc., is read and each detected pixel is labeled as a good pixel, weak pixel or bad pixel according to the differences between the pixel and surrounding pixels. It should be noted that the captured frame, for example, is a Bayer pattern image, in which each pixel contains information about R-channel, Gr-channel, Gb-channel or B-channel and the channel information is different from that of the adjacent pixels in the row and column directions. Thus, the surrounding pixels may belong to the same or different channel as or from that of the detected pixel. Details may be found in the following paragraphs. The second stage detects a short bad-pixel cluster (steps S440 to S460), in which whether weak pixels in conjunction with bad pixels labeled in the first stage form a short bad-pixel cluster. Specifically, in the first stage, the processing unit 110 sequentially reads m×m pixels from the frame buffer 130 as a block to be detected (step S410), labels the type of each detected pixel thereof, generates a flag of each detected pixel thereof and stores each pixel flag in the flag buffer 430 (step S420). In step S420, specifically, the processing unit 110 may obtain n×n full-channel pixels surrounding the detected pixel (for example, 3×3 pixels, also referred to as an inner block) and n×n same-channel pixels surrounding the detected pixel (also referred to as an outer block), where m is greater than n. FIG. 4A is a schematic diagram illustrating acquisition of the inner block and the outer block for a detected Gr-pixel according to an embodiment of the invention. Assume that the detected pixel is the pixel G7 of the 5×5 block 511: The inner block 513 contains {G4,B2,G5,R3,G7,R4,G9,B5,G10} and the outer block 515 contains {G1,G2,G3,G6,G7,G8,G11,G12,G13}. FIG. 4B is a schematic diagram illustrating acquisition of the inner block and the outer block for a detected R-pixel according to an embodiment of the invention. Assume that the detected pixel is the pixel R5 of the 5×5 block 531: The inner block 533 contains {B1,G4,B2,G6,R5,G7,B3,G9,B4} and the outer block 535 contains {R1,R2,R3,R4,R5,R6,R7,R8,R9}. FIG. 4C is a schematic diagram illustrating acquisition of the inner block and the outer block for a detected B-pixel according to an embodiment of the invention. Assume that the detected pixel is the pixel B5 of the 5×5 block 551: The inner block 553 contains {R1,G4,R2,G6,B5,G7,R3,G9,R4} and the outer block 535 contains {B1,B2,B3,B4,B5,B6,B7,B8,B9}. Now refer to FIG. 3. Next, the processing unit 110 obtains a final inner-counter indicating a total amount of n×n−1 surrounding pixels of the n×n inner block, which significantly differ from the detected pixel. In an embodiment, the processing unit 110 may use two inner counters. One records a total amount of surrounding pixels of the inner block 513, 533 or 553, which positively differ from the detected pixel over a predefined threshold. The other records a total amount of surrounding pixels of the inner block 513, 533 or 553, which negatively differ from the detected pixel over a predefined threshold. The maximum of the inner counters is treated as the final inner-counter. The processing unit 110 obtains a final outer-counter indicating a total amount of n×n−1 surrounding pixels of the n×n outer block, which significantly differ from the detected pixel. In an embodiment, the processing unit 110 may use two outer counters. One records a total amount of surrounding pixels of the outer block 515, 535 or 555, which positively differ from the detected pixel over a predefined threshold. The other records a total amount of surrounding pixels of the outer block 515, 535 or 555, which negatively differ from the detected pixel over a predefined threshold. The maximum of the outer counters is treated as the final outer-counter. In addition, in some embodiments, the processing unit 110 further determines whether the detected block contains a texture. For example, the processing unit 110 determines that the detected block contains a texture when the final inner-counter equals or is less than 5. If the detected block contains a texture, the processing unit 110 labels the detected pixel as a good pixel, no matter whether the detected pixel significantly differs from the surrounding pixels or not. That is, the differences result from a texture, rather than the detected pixel being a bad pixel. For example, either an inner block or an outer block contains 8 surrounding pixels when n=3. In some embodiments, the processing unit 110 sets the flag of the detected pixel as "11" to indicate a bad pixel when the final inner-counter is 8 and the final outer-counter is 6 or when the final outer-counter is 8. The processing unit 110 sets the flag of the detected pixel as "01" to indicate a weak pixel when the final outer-counter is 7. The processing unit 110 sets the flag of the detected pixel as "10" to indicate a bad pixel converted from a weak pixel when the final outer-counter is 7 and the final inner-counter is 8. The processing unit 110 sets the flag of the detected pixel as "00" to indicate a good pixel when the final outer-counter equals or is less than 6 or when the detected block contains a texture. The processing unit 110 stores the flag of the detected block in the flag buffer 430. The flag buffer 430 may be implemented in the frame buffer 130 or the volatile memory 150.

In an embodiment of the second stage, either an inner block or an outer block contains 9 pixels when n=3. Assume that the coordinates of the detected pixel is [x,y], a labeled block contains 3×3 full-channel pixels and the detected pixel is as a vertex-location pixel of the labeled block, herein taking the vertex-location pixel is the upper-left pixel of the labeled block for example: The processing unit 110 determines whether pixel flags at the coordinates [x,y] to [x+2,y+2] are present (step S440). If so, the processing unit 110 reads 9 pixel flags at the coordinates [x,y] to [x+2,y+2] from the flag buffer 430 (step S450). Next, the processing unit 110 determines whether the labeled block contains a short bad-pixel cluster according to the read pixel flags and accordingly updates the associated pixel flags of the flag buffer 430 (step S460). In detail, step S460 may contain two sub-steps (may be performed in parallel without limiting to the specified order). In the first sub-step, it is determined that the labeled block contains the weak-pixel pair when the labeled block of 3×3 full-channel has only two weak pixels of the same channel. In the second sub-step, it is determined whether a search block of m×m full-channel pixels (in an example of n=3 and m=5, being a 5×5 full-channel search block) containing the detected pixel as the center has only one bad pixel. That is, the processing unit 110 determines whether the search block has only one bad pixel according to the pixel flags. If the determinations are all "yes", then the two pixels of the found weak-pixel pair, which are originally labeled as weak pixel (pixel flags being "01"), are newly labeled as bad pixels converted from weak pixels (pixel flags being "10"). That is, the short bad-pixel cluster is composed of the aforementioned two bad pixels converted from weak pixels (pixel flags being "10") and the bad pixel. In an embodiment, in the second sub-step of step S460, the processing unit 110 may further determine whether the locations of two weak pixels of the same channels found in the first sub-step in conjunction with the location of the bad pixel of the search block forms a continuity so as to ensure a short bad-pixel cluster. In this way, it is not a limitation for the search block to contain only one bad pixel. The processing unit 110 updates the flags of two weak pixels (pixel flag being "01") with that indicating bad pixels converted from weak pixels (pixel flags being "10") when the locations of a weak-pixel pair of the labeled block in conjunction with the location of the bad pixel of the search block forms a continuity. It should be noted that the embodiment determining a continuity of the locations yields fewer false positives but requires excessive computation. The designer may selectively implement one method depending on different system requirements.

Figure 5:
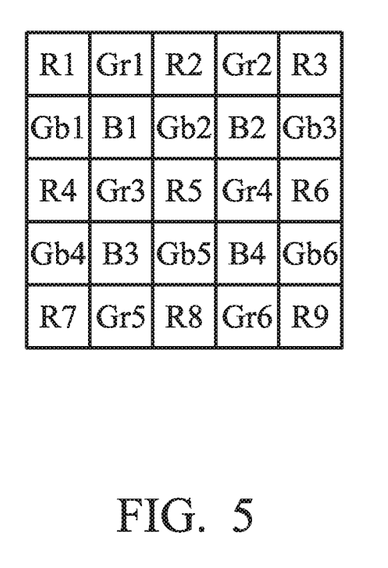
FIG. 5 is a schematic diagram of a Bayer pattern according to an embodiment of the invention.

Now refer back to FIG. 2. The correction algorithm used in step S250 updates each bad pixel with an average of eight surrounding not-bad pixels of the same channel. The flag of the not-bad pixel may be "11" or "10". FIG. 5 is a schematic diagram of a Bayer pattern according to an embodiment of the invention. For example, the processing unit 110 updates the original value of the pixel R5 with an average of values of not-bad pixels R1 to R4 and R6 to R9 when the flag of the pixel R5 indicates a bad pixel. However, the invention is not limited to the aforementioned correction algorithm. The updated pixels here include bad pixels labeled as "11" and bad pixels converted from weak pixels labeled as "10" and the not-bad pixels here include good pixels labeled as "00" and weak pixels labeled as "01".

The embodiments of the methods for correcting bad pixels and apparatuses using the same are provided under dynamic BPC to precisely label bad pixels and good pixels first. As to the weak pixels, which are easy to be misjudged, the embodiments of the invention determine whether a short bad-pixel cluster is present according to the locations of the detected weak-pixel pair and the bad pixel, without computing coordinates of all pixels, resulting in reduced computing complexity and fewer false positives.

Although the embodiment has been described in FIG. 1 as having specific elements, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for correcting bad pixels, performed by a processing unit, the method comprising:
   reading a block of a frame;
   labeling each pixel of the block as a good pixel, a weak pixel, or a bad pixel;
   detecting a weak-pixel pair from the block, wherein the weak-pixel pair includes two pixels labeled as weak pixels;
   re-labeling the pixels of the weak-pixel pair as bad pixels converted from weak pixels; and
   correcting the pixels labeled as the bad pixels, and the bad pixels converted from weak pixels,
   wherein the step of labeling each pixel of the block as a good pixel, a weak pixel, or a bad pixel is performed according to information indicating a total amount of surrounding pixels of a full-channel block, which significantly differ from said pixel, and a total amount of surrounding pixels of a same-channel block, which significantly differ from said pixel.

2. The method of claim 1, wherein the frame is a Bayer pattern image, the block comprises m×m full-channel pixels, and the step of labeling each pixel of the block as a good pixel, a weak pixel, or a bad pixel further comprises:
   obtaining n×n full-channel pixels surrounding a detected pixel as an inner block and n×n same-channel pixels surrounding the detected channel as an outer block, where m is greater than n;
   obtaining a final inner-counter indicating a total amount of surrounding pixels of the inner block, which significantly differ from the detected pixel;
   obtaining a final outer-counter indicating a total amount of surrounding pixels of the outer block, which significantly differ from the detected pixel; and
   labeling the detected pixel as a good pixel, a weak pixel, or a bad pixel, according to the final inner-counter and the final outer-counter.

3. The method of claim 2, wherein the step of obtaining the final inner-counter indicating a total amount of surrounding pixels of the inner block, which significantly differ from the detected pixel, further comprises:

using a first inner counter to record a first total amount of the surrounding pixels of the inner block, which positively differ from the detected pixel over a predefined threshold;
using a second inner counter to record a second total amount of the surrounding pixels of the inner block, which negatively differ from the detected pixel over the predefined threshold; and
treating the maximum of the first and second total amounts as the final inner-counter.

4. The method of claim 2, wherein the step of obtaining the final outer-counter indicating a total amount of surrounding pixels of the outer block, which significantly differ from the detected pixel, further comprises:
using a first outer counter to record a third total amount of the surrounding pixels of the outer block, which positively differ from the detected pixel over a predefined threshold;
using a second outer counter to record a fourth total amount of the surrounding pixels of the outer block, which negatively differ from the detected pixel over the predefined threshold; and
treating the maximum of the third and fourth total amounts as the final outer-counter.

5. The method of claim 2, further comprising:
determining whether the block comprises a texture; and
labeling the detected pixel as the good pixel when the block comprises the texture.

6. The method of claim 2, wherein the step of labeling the detected pixel as a good pixel, a weak pixel, or a bad pixel according to the final inner-counter and the final outer-counter further comprises:
labeling the detected pixel as the weak pixel when the final outer-counter is a first value.

7. The method of claim 2, wherein the step of labeling the detected pixel as a good pixel, a weak pixel, or a bad pixel according to the final inner-counter and the final outer-counter further comprises:
labeling the detected pixel as the bad pixel when the final outer-counter is a second value and the final inner counter is a third value;
labeling the detected pixel as the bad pixel when the final outer-counter is the third value; and
labeling the detected pixel as the good pixel when the final outer-counter equals or is less than the second value,
wherein the second value is less than the third value.

8. The method of claim 1, wherein the step of detecting a weak-pixel pair from the block further comprises:
obtaining a plurality of pixel flags of the block;
obtaining a labeled block containing n×n full-channel pixels, wherein the detected pixel labeled as the weak pixel is a vertex-location pixel of the labeled block; and
determining that the labeled block comprises the weak-pixel pair when the labeled block comprises only two weak pixels of the same channel.

9. The method of claim 8, wherein the step of re-labeling the pixels of the weak-pixel pair as bad pixels converted from weak pixels further comprises:
obtaining a search block containing m×m full-channel pixels, wherein the detected pixel labeled as the weak pixel is the center of the search block, where m is greater than n; and
re-labeling the pixels of the weak-pixel pair as the bad pixels converted from weak pixels when the pixel flags indicate that the search block comprises only one bad pixel.

10. The method of claim 8, wherein the step of re-labeling the pixels of the weak-pixel pair as bad pixels converted from weak pixels further comprises:
obtaining a search block containing m×m full-channel pixels, wherein the detected pixel labeled as the weak pixel is the center of the search block, where m is greater than n; and
re-labeling the pixels of the weak-pixel pair as the bad pixels converted from weak pixels when locations of the weak pixels of the weak-pixel pair in conjunction with the location of the bad pixel form a continuity.

11. The method of claim 1, further comprising:
using a pixel flag to store information regarding each pixel being labeled as a good pixel, a weak pixel, or a bad pixel.

12. An apparatus for correcting bad pixels, comprising:
a camera module controller, coupled to a camera module;
a processing unit, coupled to the camera module controller, obtaining a frame via the camera module controller; reading a block from the frame; labeling each pixel of the block as a good pixel, a weak pixel, or a bad pixel; detecting a weak-pixel pair from the block, wherein the weak-pixel pair includes two pixels labeled as weak pixels; re-labeling the pixels of the weak-pixel pair as bad pixels converted from weak pixels; and correcting the pixels labeled as the bad pixel, and the bad pixels converted from weak pixels,
wherein the processing unit labels each pixel of the block as the good pixel, the weak pixel, or the bad pixel according to information indicating a total amount of surrounding pixels of a full-channel block, which significantly differ from said pixel, and a total amount of surrounding pixels of a same-channel block, which significantly differ from said pixel.

13. The apparatus of claim 12, wherein the frame is a Bayer pattern image, the block comprises m×m full-channel pixels and the processing unit obtains n×n full-channel pixels surrounding a detected pixel as an inner block and n×n same-channel pixels surrounding the detected channel as an outer block, where m is greater than n; obtains a final inner-counter indicating a total amount of surrounding pixels of the inner block, which significantly differ from the detected pixel; obtains a final outer-counter indicating a total amount of surrounding pixels of the outer block, which significantly differ from the detected pixel; and labels the detected pixel as a good pixel, a weak pixel, or a bad pixel according to the final inner-counter and the final outer-counter.

14. The apparatus of claim 13, wherein the processing unit further uses a first inner counter to record a first total amount of the surrounding pixels of the inner block, which positively differ from the detected pixel over a predefined threshold; uses a second inner counter to record a second total amount of the surrounding pixels of the inner block, which negatively differ from the detected pixel over the predefined threshold; and treats the maximum of the first and second total amounts as the final inner-counter.

15. The apparatus of claim 13, wherein the processing unit further uses a first outer counter to record a third total amount of the surrounding pixels of the outer block, which positively differ from the detected pixel over a predefined threshold; uses a second outer counter to record a fourth total amount of the surrounding pixels of the outer block, which negatively differ from the detected pixel over the predefined threshold; and treats the maximum of the third and fourth total amounts as the final outer-counter.

16. The apparatus of claim 13, wherein the processing unit further determines whether the block comprises a texture; and labels the detected pixel as the good pixel when the block comprises the texture.

17. The apparatus of claim 13, wherein the processing unit further labels the detected pixel as the weak pixel when the final outer-counter is a first value.

18. The apparatus of claim 13, wherein the processing unit further labels the detected pixel as the bad pixel when the final outer-counter is a second value and the final inner counter is a third value; labels the detected pixel as the bad pixel when the final outer-counter is the third value; and labels the detected pixel as the good pixel when the final outer-counter equals or is less than the second value, where the second value is less than the third value.

19. The apparatus of claim 12, wherein the processing unit further obtains a plurality of pixel flags of the block; obtains a labeled block containing n×n full-channel pixels, wherein the detected pixel labeled as the weak pixel is a vertex-location pixel of the labeled block; and determines that the labeled block comprises the weak-pixel pair when the labeled block comprises only two weak pixels of the same channel.

20. The apparatus of claim 19, wherein the processing unit further obtains a search block containing m×m full-channel pixels, wherein the detected pixel labeled as the weak pixel is the center of the search block, where m is greater than n; and re-labels the pixels of the weak-pixel pair as the bad pixels converted from weak pixels when the pixel flags indicate that the search block comprises only one bad pixel.

* * * * *